United States Patent
Delorme et al.

(10) Patent No.: US 11,027,829 B2
(45) Date of Patent: Jun. 8, 2021

(54) AIRCRAFT PROVIDED WITH A BUOYANCY SYSTEM, AND A BUOYANCY METHOD

(71) Applicant: AIRBUS HELICOPTERS, Marignane (FR)

(72) Inventors: Louis Delorme, Ensues la Redonne (FR); Pierre Prud'Homme Lacroix, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 47 days.

(21) Appl. No.: 15/987,122

(22) Filed: May 23, 2018

(65) Prior Publication Data

US 2018/0346105 A1 Dec. 6, 2018

(30) Foreign Application Priority Data

Jun. 2, 2017 (FR) ...................................... 1770571

(51) Int. Cl.
| | |
|---|---|
| *B64C 25/56* | (2006.01) |
| *B64C 25/54* | (2006.01) |
| *B64C 27/04* | (2006.01) |
| *B64C 25/32* | (2006.01) |
| *G05D 7/06* | (2006.01) |

(52) U.S. Cl.
CPC .............. *B64C 25/56* (2013.01); *B64C 25/54* (2013.01); *B64C 27/04* (2013.01); *B64C 2025/325* (2013.01); *G05D 7/0629* (2013.01)

(58) Field of Classification Search
CPC ... B64C 25/56; B64C 25/54; B64C 2025/325; B64C 27/04; B64C 27/006; B64C 35/002; G05D 7/0629; B64D 24/18; B64D 2100/00; B64D 25/18; B64D 25/00
See application file for complete search history.

(56) References Cited

U.S. PATENT DOCUMENTS

| | | | | |
|---|---|---|---|---|
| 1,776,865 A | * | 9/1930 | Salisbury | ................ B64C 35/00 244/107 |
| 4,165,059 A | * | 8/1979 | Summer | ................. B64C 25/56 114/292 |
| 5,765,778 A | * | 6/1998 | Otsuka | .................... B64C 25/56 244/100 A |
| 9,260,192 B2 | * | 2/2016 | Lu | .......................... B64D 25/00 |

(Continued)

FOREIGN PATENT DOCUMENTS

| | | |
|---|---|---|
| DE | 1213255 B | 3/1966 |
| EP | 1429958 B1 | 5/2007 |

(Continued)

OTHER PUBLICATIONS

French Search Report for French Application No. FR1770571, Completed by the French Patent Office, dated Jan. 22, 2018, 7 pages.

*Primary Examiner* — Medhat Badawi
*Assistant Examiner* — Vicente Rodriguez
(74) *Attorney, Agent, or Firm* — Brooks Kushman P.C.

(57) ABSTRACT

A buoyancy method for deploying a plurality of floats of a buoyancy system of an aircraft. The plurality of floats comprises a plurality of main floats and a plurality of secondary floats that are folded in flight. The method comprises a step of deploying the main floats in flight prior to ditching, and a step of deploying the secondary floats after ditching.

16 Claims, 3 Drawing Sheets

(56) References Cited

U.S. PATENT DOCUMENTS

| | | | |
|---|---|---|---|
| 9,315,263 B2 | 4/2016 | Cacciaguerra | |
| 9,620,192 B2* | 4/2017 | Kim | G11C 11/40611 |
| 10,000,281 B2 | 6/2018 | Delorme et al. | |
| 2003/0060101 A1* | 3/2003 | Parrott | B64C 25/56 |
| | | | 441/40 |
| 2011/0260001 A1* | 10/2011 | Ferrier | B64C 25/52 |
| | | | 244/104 FP |
| 2014/0145030 A1* | 5/2014 | Bardy | B64C 25/56 |
| | | | 244/107 |
| 2014/0252165 A1 | 9/2014 | Smith et al. | |
| 2014/0319265 A1* | 10/2014 | Cacciaguerra | B64C 27/22 |
| | | | 244/6 |
| 2015/0360758 A1* | 12/2015 | Rivault | B63B 7/06 |
| | | | 114/360 |
| 2018/0305040 A1* | 10/2018 | Poster | B64C 25/56 |

FOREIGN PATENT DOCUMENTS

| | | |
|---|---|---|
| FR | 2997923 A1 | 5/2014 |
| FR | 3043061 A1 | 5/2017 |
| FR | 3047231 A1 | 8/2017 |

\* cited by examiner

AIRCRAFT PROVIDED WITH A BUOYANCY SYSTEM, AND A BUOYANCY METHOD

CROSS-REFERENCE TO RELATED APPLICATIONS

This application claims priority to French patent application No. FR 1770571 filed on Jun. 2, 2017, the disclosure of which is incorporated in its entirety by reference herein.

BACKGROUND OF THE INVENTION

(1) Field of the Invention

The present invention relates to an aircraft provided with a buoyancy system, and it also relates to a buoyancy method.

2) Description of Related Art

Under such circumstances, the invention lies in the technical field of buoyancy systems for aircraft, and more particularly for a rotary wing aircraft.

Such a buoyancy system contributes to enabling an aircraft to float in stable manner after ditching in water. By way of example, the buoyancy system may be used following forced ditching in order to enable the occupants of the aircraft to evacuate it. Aircraft that performs missions of transporting people off-shore are in principle fitted with such buoyancy systems.

Certification regulations also specify that an aircraft must be capable of ditching and floating in stable manner on the water with its buoyancy system. Stability must be effective for certain states of the free surface of the water and for certain wind levels that are defined in those certification regulations.

Those states of the free surface of the water are also referred to as "sea states", and they apply to any liquid surface. The term "ditching" covers an aircraft landing on any free water surface, whether it be the sea or on a lake, for example. Certification regulations require an aircraft to be stable with a particular sea state.

A buoyancy system may include floats.

The floats are fastened on either side of an airframe of the aircraft. The term "airframe" is used in particular to designate a portion of the aircraft housing a cockpit, and possibly also a cabin and a hold, and possibly including landing gear. On a helicopter, the airframe carries the main rotor of the helicopter. By way of example, floats may be fastened to landing gear of the airframe, or else to a wall of the airframe.

Furthermore, the floats may for example be folded under normal flying conditions, and then deployed in the event of ditching. By way of illustration, a float may comprise an inflatable bag that can be attached to an airframe by means of at least one cord.

A buoyancy system comprising folded floats then includes deployment means for deploying the floats, e.g. an inflater. Certain buoyancy systems include deployment means that are deployed under the control of the pilot and/or the copilot, for example, and/or under the control of an automatic trigger device. For example, a button may be located on a stick operated by a pilot, the button being connected to an inflater. Operating the button then causes the float to inflate.

In addition, in a first strategy, the floats may be deployed after ditching.

This first strategy makes it possible to avoid subjecting the floats to the forces that result from ditching. This makes the floats and the cords easier to design. Furthermore, the means for deploying the floats may include immersion sensors for detecting the presence of water in order to activate deployment of the floats without involving a pilot.

In contrast, the buoyancy of the aircraft is not optimized until the floats have been deployed.

In a second strategy, the floats may be deployed in flight, i.e. before the aircraft touches the water. When a pilot or a system detects that ditching is about to take place, the pilot or the system causes the floats to be deployed. This second strategy is advantageous in that it ensures that buoyancy of the aircraft is optimized even before the aircraft is on the water. The depth to which the aircraft goes down into the water on ditching can then be minimized. Furthermore, the floats absorb a portion of the force to which the aircraft is subjected during ditching.

Nevertheless, under such circumstances, the buoyancy system needs to be designed to withstand the forces that result from the impact of the aircraft on the water. The floats may also tend to move considerably as a result of coming into contact with the water and they run the risk of striking against surfaces of the aircraft. This can lead to such surfaces being pushed in.

Optionally, the aircraft may include in parallel an emergency system for deploying the floats after ditching.

The second strategy is sometimes preferred in order to optimize the buoyancy of an aircraft because of its ability to tend to stabilize the aircraft as soon as it touches the water, since the floats are deployed in flight. Nevertheless, designing such a buoyancy system for applying this second strategy can be difficult.

In this context, document FR 3 047 231 describes a method of authorizing inflation of floats in flight under predetermined conditions that tend to limit the impacts of such inflation.

Document EP 1 429 958 is remote from this problem in that it describes a buoyancy system having at least one inflatable float and an inflatable raft.

Documents FR 3 043 061, US 2003/060101, FR 2 997 923, DE 1 213 255, and US 2014/252165 are also known.

BRIEF SUMMARY OF THE INVENTION

An object of the present invention is thus to propose a method and an aircraft including a novel buoyancy system.

The invention thus provides a buoyancy method for deploying a plurality of floats of a buoyancy system of an aircraft.

The plurality of floats comprises a plurality of main floats and a plurality of secondary floats, said main floats and said secondary floats being folded in flight and being for deploying outside an airframe of the aircraft in order to stabilize said aircraft on a liquid surface, the method comprising the following steps:

deploying said main floats in flight prior to ditching, namely before the aircraft reaches a liquid surface; and deploying said secondary floats after ditching.

The term "outside an airframe" means that the floats are not arranged within a cabin, but are situated on the outside of the aircraft once they are deployed.

Such a method tends to combine the advantages of the above-mentioned first and second strategies.

Specifically, the method provides for deploying floats sequentially.

When the crew or calculation means of the aircraft detect that ditching is imminent, only the main floats are deployed in flight. The main floats contribute to stabilizing the aircraft on the liquid surface at the moment of impact on that liquid surface. After ditching, the secondary floats are deployed in turn in order to increase the stability of the aircraft.

Because of the presence of the secondary floats, the main floats may be of smaller dimensions than the floats in the prior art. For example, a prior art float is replaced by both a main float and also a secondary float, the main float and the secondary float together presenting a volume that is substantially equal to the volume of the prior art float, or possibly even a smaller volume given an increased spread of the float. Under such circumstances, the main floats are subjected to forces that are smaller than the forces to which prior art floats are subjected.

Compared with a buoyancy system applying the first strategy of the prior art, this method tends to reduce the loads exerted on the floats and the associated fastener devices during ditching. This can result in a weight savings.

In addition, the method tends to reduce the risk of the floats being punctured on coming into contact with the liquid surface.

Furthermore, because of the presence of the secondary floats, the consequences of a main float bursting on ditching can be minimized. Likewise, the consequences of an accidental puncture can be reduced.

In another aspect, the secondary floats may be spaced apart by a large spread, which spread tends to improve the stability of the aircraft.

The freedom of movement of the floats is possibly also limited.

Compared with a buoyancy system making use of the second strategy of the prior art, this method tends to improve the stability of the aircraft during ditching, and tends to limit the depth to which the aircraft goes down into the water.

In addition, the main floats tend to reduce the load that needs to be absorbed by the airframe on impact with the liquid surface.

The method may also include one or more of the following characteristics.

Thus, the method may include a step of pairing said floats, said plurality of floats comprising at least one pair of main floats and at least one pair of secondary floats, each of said at least one pair of main floats comprising two main floats arranged transversely on either side of said airframe, and each of said at least one pair of secondary floats comprising two secondary floats arranged transversely on either side of said airframe.

The floats are paired in order to optimize the stability of the aircraft.

In an aspect, the method may include a step of forming a plurality of float units, each float unit comprising a single main float and a single secondary float arranged side by side, each main float of a float unit being arranged transversely between the secondary float of said float unit and said airframe of the aircraft.

The aircraft then has float units, each comprising a secondary float arranged beside or indeed against a main float. A float unit tends to form a float having two compartments.

The secondary float of a float unit may be secured to the main float of that float unit. In one variant, the secondary float of a float unit is stitched and/or adhesively bonded to the main float of the float unit. In another variant, the secondary float and the main float of a float unit present a common partition, thereby forming a single compartmentalized balloon.

In addition, a secondary float of a float unit is spaced apart from the airframe by the main float of the float unit. This configuration tends to maximize the transverse distance between two secondary floats and thus to improve the floating stability of the aircraft. Because of this arrangement, the main floats may be referred to as "inner" floats and the secondary floats may be referred to as "outer" floats. Furthermore, the volumes of the main and secondary floats, once deployed, may optionally be minimized.

The invention also provides an aircraft having a buoyancy system, said buoyancy system comprising a plurality of floats, each float of said plurality of floats being folded in flight other than during a stage of ditching, said buoyancy system including a deployment system for deploying each float of said plurality of floats outside an airframe of the aircraft.

Said plurality of floats comprises a plurality of main floats and a plurality of secondary floats, said buoyancy system being configured to deploy said main floats outside said airframe in flight prior to ditching and to deploy said secondary floats outside said airframe after ditching.

The aircraft may also include one or more of the following characteristics.

Thus, the plurality of floats may form a plurality of float units, each float unit having a single main float and a single secondary float arranged side by side, a main float of a float unit being arranged transversely between the secondary float of said float unit and said airframe.

For example, each float unit may be arranged to take the place of a prior art float.

Optionally, said plurality of float units comprises at least one pair of float units, said at least one pair of float units comprising two float units arranged transversely on either side of said airframe.

For example, the aircraft may have an even number of float units, the float units also being paired.

By way of illustration, the aircraft may have a front pair of float units comprising a left front float unit and a right front float unit. The aircraft may have a rear pair of float units comprising a left rear float unit and a right rear float unit. The terms "front" and "rear" should be considered relative to the direction of advance of the aircraft towards the front.

In an aspect, said two float units of a pair of float units are arranged symmetrically on either side of said airframe.

For example, the two float units of a pair of float units may be arranged symmetrically on either side of an anteroposterior plane of symmetry of the aircraft.

In an aspect, a secondary float and a main float may have a partition in common.

In an aspect, a secondary float is stitched and/or adhesively bonded to a main float.

The term "and/or" means that either a secondary float is stitched to a main float, or that a secondary float is adhesively bonded to a main float, or indeed that a secondary float is both stitched and adhesively bonded to a main float.

In an aspect, each main float is connected to the airframe by at least one main cord.

Thus, a main float is locally attached to the airframe of the aircraft, but it can move relative to the airframe. Furthermore, such a cord seeks to limit the freedom of movement of the main float.

In an aspect, each secondary float is connected to the airframe by at least one secondary cord.

Optionally, each secondary float is also secured to a main float, either by presenting a partition in common with the main float or else by being adhesively bonded and/or stitched to the main float.

The secondary floats may have cords specific thereto in order to optimize the stability of the aircraft.

In a first embodiment, the deployment system may comprise at least one main inflater in fluid flow communication with only at least one main float to deploy only the at least one main floats, said deployment system including at least one secondary inflater in fluid flow communication with only at least one secondary float in order to inflate only the at least one secondary floats.

The term "with only at least one main float" means that a main inflater cannot be directly connected to a secondary float. A main inflater injects fluid into one or more main floats. Likewise, the term "with only at least one secondary float" means that a secondary inflater cannot be connected directly to a main float.

The term "inflater" designates any system serving to inflate at least one float, i.e. enabling it to be unfolded so as to make it operational. Thus, the inflater may be a device that injects fluid into a float or that deform a float. By way of example, the inflater may be an inflater that is electrical, explosive, or chemical.

The deployment system may include various inflaters respectively associated with deploying the main floats and the secondary floats.

The main floats and the secondary floats are independent, the deployment of the main floats not leading to the deployment of the secondary floats, and vice versa.

In a second embodiment, each secondary float is in fluid flow communication with at least one main float via a valve, said deployment system comprising at least one main inflater in fluid flow communication with only the main floats in order to inject a fluid only into the main floats, no inflater directly feeding any secondary float with fluid.

Prior to ditching, each main inflater injects fluid into at least one main float in order to inflate it. Each main float thus presents a first volume V1, with a first pressure P1 existing inside the main float.

The valves are also closed. Under such circumstances, the secondary floats are not deployed.

At the moment of the aircraft impacting against a liquid surface, or possibly as a result of the impact, the valves are open.

The secondary floats are then inflated using the fluid contained in the main floats. At equilibrium, the main floats and the secondary floats are inflated.

In a first variant of the second embodiment, said valve is a passive valve, said passive valve opening when pressure existing in said main float provided with the passive valve exceeds a threshold, said pressure being less than said threshold prior to ditching.

Such a passive valve may be in the form of a pressure release valve, a ball valve, . . . .

In a second variant of the second embodiment, said aircraft includes a processor unit, said valve is an active valve, said active valve is connected to said processor unit, and said active valve is controlled by said processor unit.

By way of example, an active valve may be an electromechanical valve controlled by a processor unit so as to open it or close it.

BRIEF DESCRIPTION OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

Three mutually orthogonal directions X, Y, and Z are shown in some of the figures.

The first direction X is said to be longitudinal. The term "longitudinal" relates to any direction parallel to the first direction X.

The second direction Y is said to be transverse. The term "transverse" relates to any direction parallel to the second direction Y.

Finally, the third direction Z is said to be in elevation. The term "in elevation" relates to any direction parallel to the third direction Z.

Figure 1:
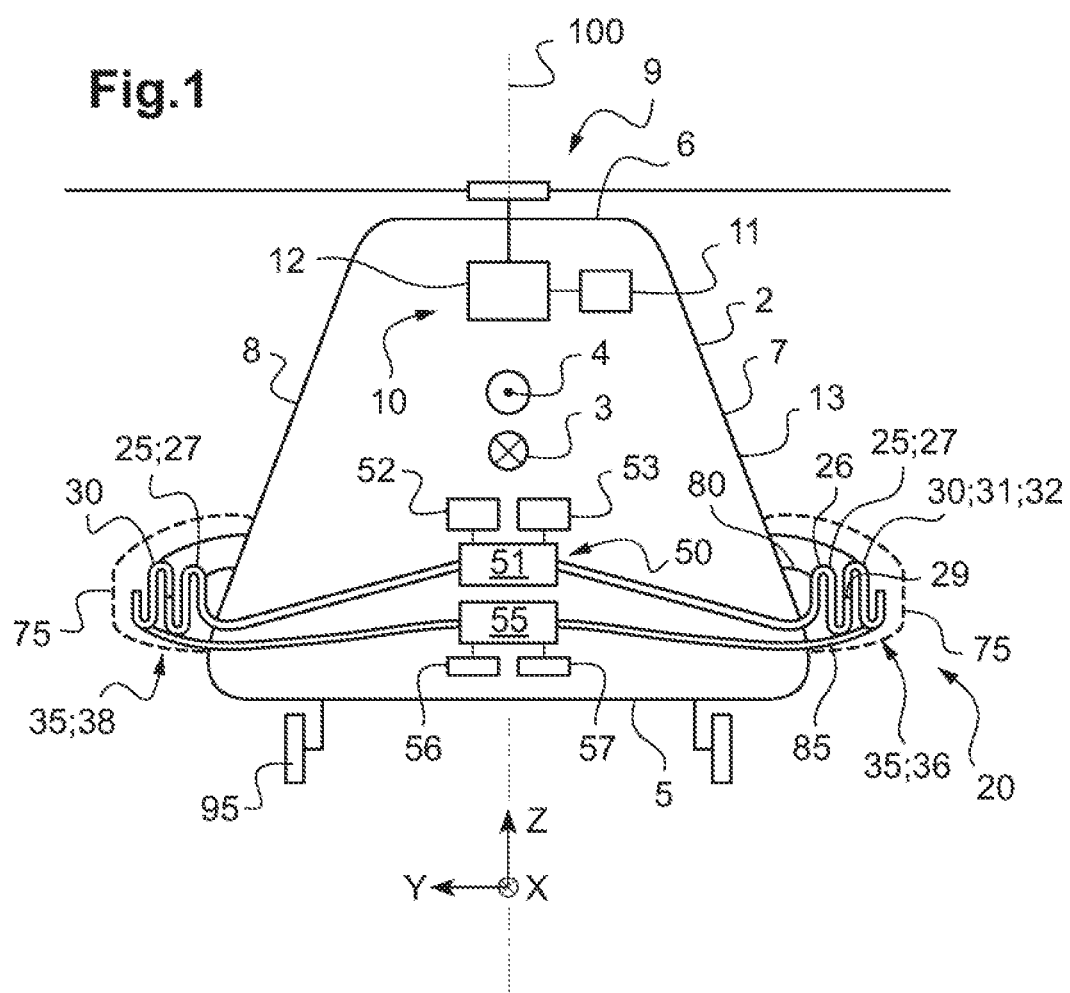
FIG. 1 is a diagram showing an aircraft of the invention having main floats and secondary floats that are folded in forward flight and that are not in fluid flow communication.

FIG. 1 shows an aircraft 1 having a buoyancy system 20 of the invention. The aircraft may for example be a rotorcraft.

The aircraft 1 has an airframe 2. The airframe 2 extends longitudinally from a front end 4 to a rear end 3 along an anteroposterior plane 100. In addition, the airframe 2 extends transversely from a left flank 7 to a right flank 8 on either side of the anteroposterior plane 100, and it extends in elevation from a bottom portion 5 to a top portion 6. Optionally, the anteroposterior plane is a plane of symmetry of the aircraft. The terms "left" and "right" are defined as seen by an individual located in the airframe and looking forwards towards the front of the aircraft.

The bottom portion 5 includes a bottom of the airframe 2, while the top portion 6 includes a top of the airframe 2. The bottom portion 5 is conventionally provided with landing gear 95, whereas the top portion may carry a rotor 9 that contributes to providing the aircraft with lift and possibly also propulsion. The rotor 9 is driven in rotation by a power plant 10. The power plant 10 includes at least one engine 11 and at least one main power transmission gearbox (MGB) 12 interposed between the engine 11 and the rotor 9.

The airframe may carry other rotors, e.g. a tail rotor contributing to controlling yaw movement of the rotorcraft.

In addition, the aircraft 1 is also provided with a buoyancy system 20 of the invention in order to enable it to ditch on water.

Such a buoyancy system 20 is provided with a plurality of floats 25, 30. Each float may comprise an envelope 26, 31 that floats on water, the envelope holding captive a gas, for example.

Each float 25, 30 may be attached via its envelope and/or by means of at least one cord 80, 85 to a structure of the airframe 2, specifically by way of example to a wall 13 of the airframe 2 or to an undercarriage, . . . . By way of example, the floats 25, 30 are connected to a low portion of the aircraft situated in the proximity of, or indeed level with, the bottom of the airframe. Where appropriate, the floats 25, 30 may be connected to a skid undercarriage.

In particular, the buoyancy system 20 is provided with at least two "main" floats 25. Each main float 25 is located on the outside EXT of the airframe 2. The term "located on the outside EXT of the airframe 2" means that the floats in question are deployed at least in part outside the airframe 2 in order to enable the aircraft to float. The main floats 25 may be fastened in conventional manner to a wall 13 of the airframe 2 and/or to an undercarriage, for example, by means of at least one main cord 80 connecting an envelope 26 of a main float to the airframe and/or by means of the envelope 26 of a main float being fastened to the airframe.

The main floats may be paired. Thus, one pair 27 of main floats 25 comprises a left main float that is arranged beside the left flank 7 of the aircraft, and a right main float that is arranged beside the right flank 8 of the aircraft. The two main floats 25 of a pair may be arranged symmetrically on either side of the anteroposterior plane 100 of symmetry of the aircraft, when the aircraft is in a stable position.

For example, the aircraft may have one or indeed two pairs 27 of main floats 25.

Figure 2:
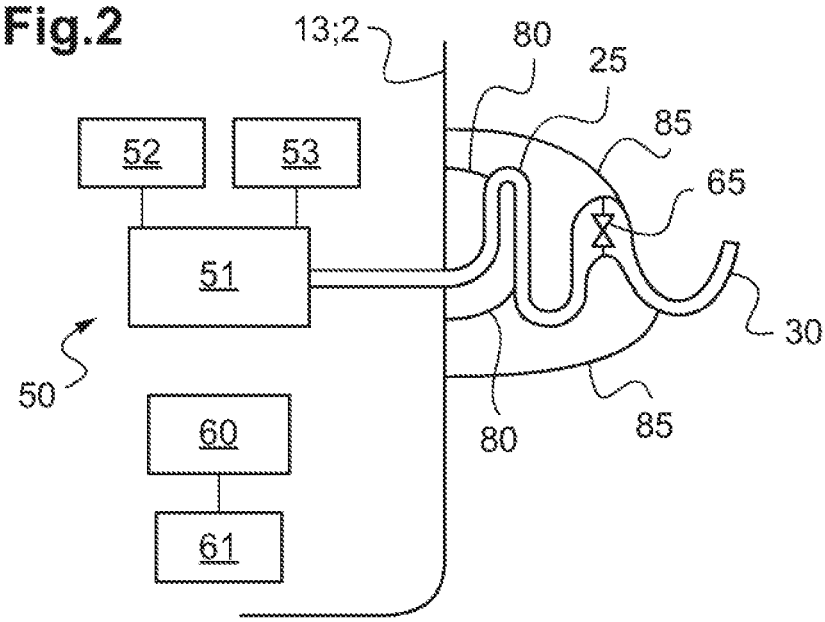
FIG. 2 is a diagram showing a main float in fluid flow communication with a secondary float.

With reference to FIG. 2, the buoyancy system 20 also has at least two "secondary" floats 30. Each secondary float 30 is arranged on the outside EXT of the airframe 2.

The secondary floats 30 may be paired. Thus, one pair 32 of secondary floats 30 comprises a left secondary float that is arranged beside the left flank 7 of the aircraft, and a right secondary float that is arranged beside the right flank 8 of the aircraft. The two secondary floats 30 of a pair may be arranged symmetrically on either side of the anteroposterior plane 100 of symmetry of the aircraft when the aircraft is in a stable position.

The secondary floats 30 may be fastened in conventional manner to a wall 13 of the airframe 2 and/or to an undercarriage, for example, by means of at least one secondary cord 85 connecting an envelope 31 of a secondary float to the airframe and/or by fastening the envelope 31 of a secondary float to the airframe.

In addition, or as an alternative, each secondary float 30 may be fastened to a main float 25. For example, an envelope 26 of a main float 25 may be stitched and/or adhesively bonded to an envelope 31 of a secondary float 30. In another example, a main float 25 and a secondary float 30 may have a partition 29 in common. The term "partition" designates a portion of the envelope 31 of a secondary float that also constitutes a portion of the envelope 26 of a main float.

A main float 25 may also be arranged transversely between a secondary float 30 and the anteroposterior plane 100 and/or the airframe 2.

Furthermore, the main floats 25 and the secondary floats 30 may form float units 35.

Such a float unit 35 comprises a main float 25 and a secondary float 30 that are arranged beside each other, and by way of example transversely, one beside the other in a direction perpendicular to the anteroposterior plane 100. Within a float unit, the main float 25 is arranged transversely between the secondary float 30 and the anteroposterior plane 100 and/or the airframe 2.

By way of example, the aircraft may have its floats in float units 35 only. The aircraft then does not have a main float 25 or a secondary float 30 that is isolated, i.e. not forming part of a float unit 35. The aircraft is provided with float units 35 only, each comprising a main float 25 and a secondary float 30.

Optionally, the aircraft includes at least one pair 39 of float units. Such a pair 39 of float units is provided with two float units arranged transversely on either side of the airframe 2 and of the anteroposterior plane 100 in a direction that is perpendicular to the anteroposterior plane 100, for example. Thus, a pair 39 of float units includes a left float unit 37 situated on the left side 7 of the aircraft and a right float unit 38 situated on the right side 8 of the aircraft.

Optionally, the aircraft has an even number of float units, all of the float units also being paired so that each of them belongs to a pair 39 of float units.

In an aspect, two float units 37, 38 in a pair 39 of float units are arranged symmetrically on either side of the airframe 2 and/or of the anteroposterior plane 100.

Furthermore, the main floats 25 and the secondary floats 30 are folded under normal conditions, i.e. other than during a stage of ditching, in order to reduce their overall size.

For example, the main floats 25 and the secondary floats 30 are folded and arranged in a conventional covering 75, which covering opens while the floats are being deployed. Where appropriate, a single covering 75 may surround both the main floats 25 and the secondary floats 30 of a float unit 35.

In order to optimize the stability of an aircraft on a liquid surface, the main floats 25 and the secondary floats 30 are deployed in order to occupy a large volume. For example, the main floats 25 and the secondary floats 30 may be inflatable floats, each of these inflatable floats presenting an envelope that unfolds when a fluid is injected into the envelope. Under such circumstances, the main floats 25 and the secondary floats 30 are deflated other than during stages of ditching, and they are inflated in order to float on a liquid surface.

In order to deploy the floats, i.e. in order to unfold them, the buoyancy system includes a deployment system 50 for deploying the main floats 25 and the secondary floats 30, i.e. for increasing the volumes of the main floats 25 and of the secondary floats 30. When the deployment system 50 is activated, it serves to unfold the main floats 25 and the secondary floats 30 in order to increase their volumes so as to stabilize the aircraft on a liquid surface.

Under such conditions, the deployment system 50 may include at least one inflater referred to for convenience as a "main" inflater 51. Each main inflater is in fluid flow communication with at least one main float 25.

For example, a single main inflater 51 is connected to all of the main floats 25 via a plurality of pipes. In another example, the deployment system has as many main inflaters as it has main floats, each main float being connected by a pipe to an inflater that is dedicated thereto. In another example, two main inflaters may be connected via at least one pipe to the same main float 25. Naturally, other configurations are possible, it being possible for a single main inflater to inflate one or more main floats.

The deployment system may include a main control member 52 connected to each main inflater in order to control the operation of each main inflater. The term "main control member" 52 designates a member that can be operated by a pilot, such as for example: a button, a touch control, a voice control, a visual control, . . . .

The deployment system may include a main automatic control system 53 that is connected to each main inflater in order to cause each main inflater to operate. The term "main automatic control system" 53 designates a system that causes each main inflater to operate in application of predetermined logic, by generating a deployment order automatically when predetermined conditions are satisfied.

The main automatic control system 53 may include a calculator, e.g. possessing a processor, an integrated circuit, a programmable system, a logic circuit, these examples not limiting the scope to be given to the term "calculator". The calculator may optionally be engaged by activation means operable by a person, for example a button. The activation means may possess at least one position enabling the main automatic control system 53 to be made active. Thus, the main automatic control system 53 may be inhibited in certain situations, e.g. while the aircraft is not overlying a liquid surface.

By way of illustration, the calculator may be connected to altitude sensors in order to request operation of the main inflater when the aircraft reaches a threshold altitude, where applicable providing the main automatic control system 53 has been engaged.

The main automatic control system 53 and/or the main control member 52 are configured to deploy the main floats in flight before ditching.

Reference may be made to the state of the art in order to find embodiments of inflaters and systems for controlling such inflaters to deploy the main floats in flight before ditching.

In the first embodiment of FIG. 1, the deployment system 50 may include at least one inflater referred to for convenience as a "secondary" inflater 55. Each secondary inflater 55 is in fluid flow communication with at least one secondary float 30.

By way of example, a single secondary inflater 55 is connected to all of the secondary floats 30 via a plurality of pipes. In another example, the deployment system has as many secondary inflaters 55 as it has secondary floats 30, each secondary float 30 being connected by a pipe to an inflater that is specific thereto. In another example, two secondary inflaters 55 may be connected via at least one pipe to a single secondary float 30. Other configurations are naturally possible, it being possible for a single secondary inflater to inflate one or more secondary floats.

The deployment system may include a secondary control member 56 connected to each secondary inflater to control the operation of each secondary inflater. The term "secondary control member" 56 designates a member that is operable by a pilot, e.g. a button, a touch control, a voice control, a visual control, . . . .

The deployment system may include a secondary automatic control system 57 connected to each secondary inflater in order to cause each secondary inflater to operate. The term "secondary automatic control system" 57 designates a system that controls each secondary inflater in application of predetermined logic by generating a deployment order automatically when predetermined conditions are satisfied. By way of illustration, a secondary automatic control system 57 is provided with calculation means and with immersion sensors in order to cause the secondary inflater to operate when the immersion sensors detect that the aircraft is immersed.

The secondary automatic control system 57 may include a calculator referred to as calculation means, e.g. possessing a processor, an integrated circuit, a programmable system, a logic circuit, these examples not limiting the scope to be given to the term "calculation means". The calculation means may optionally be engaged by activation means operable by an individual. The activation means may possess at least one position enabling the secondary automatic control system 57 to be made active. Thus, the secondary automatic control system 57 may be inhibited in certain situations, e.g. while the aircraft is not overflying a liquid surface.

The secondary automatic control system 57 and/or the secondary control member 56 are configured to deploy the secondary floats after ditching.

Reference may be made of the state of the art to find embodiments of inflaters and control systems for those inflaters in order to deploy the secondary floats after ditching.

In the second embodiment of FIG. 2, no inflater is provided for directly inflating the secondary floats 30, i.e. without passing via a main float 25.

In this second embodiment, at least one main inflater 51 is thus connected by a pipe to at least one main float 25, each main float 25 being connected by a pipe to at least one main inflater 51.

Furthermore, each secondary float 30 is connected to a main float 25 via a valve 65. For example, each secondary float 30 is connected to a single main float 25 via a valve, and each main float 25 is connected to a secondary float 30 via such a valve.

A valve 65 thus acts as an interface between a main inside volume of a main float and a secondary inside volume of a secondary float. When the valve is opened, some of the fluid contained in the main float fills the secondary float until an equilibrium position is reached. On equilibrium, the main float and the secondary float are both inflated. Where necessary, it is possible at this stage to top up the volume of fluid by acting on an inflater.

The valve 65 may be a passive valve that opens when the pressure that exists in the main inside volume exceeds a pressure threshold. The passive valve may be designed so that the threshold is reached when the main float is subjected to forces during ditching, or on activating an inflater, where appropriate.

Alternatively, the valve 65 may be an electromechanically activated valve that opens on an order from a processor unit 60. The processor unit may determine whether predetermined inflation conditions are satisfied, and it may activate the valve 65 in order to inflate the secondary floats 30.

The processor unit may be in the form of selector means operable by a person so as to enable an order to be transmitted to the calculation means to inflate the main floats and/or the secondary floats. The term "selector means" may designate a button, a touch screen, voice control means, a keypad, or a pointer for operating computer means, . . . .

The processor unit 60 may also be in the form of calculator connected to sensors. For example, at least one immersion sensor may serve to detect the presence of water, and where applicable it transmits an order to the processor unit to inflate the secondary floats 30.

By way of example, the processor unit may process a processor, an integrated circuit, a programmable system, a logic circuit, these examples not limiting the scope to be given to the term "processor unit".

Figure 3:
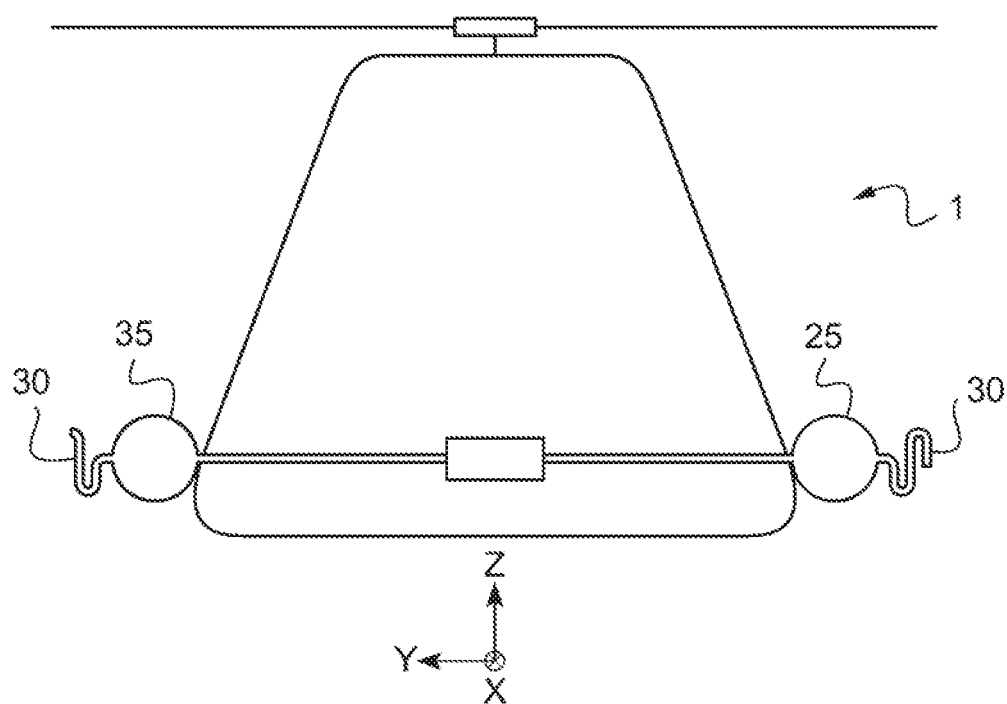
FIG. 3 is a diagram showing a step of deploying main floats in flight prior to ditching.
Figure 4:
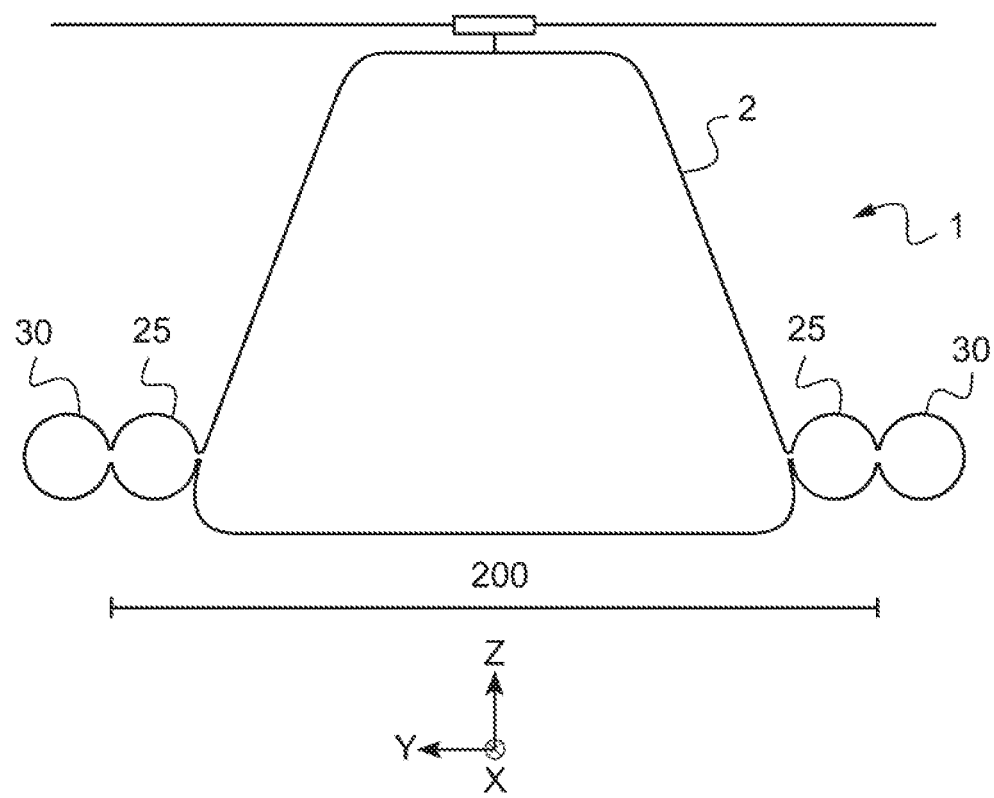
FIG. 4 is a diagram showing a step of deploying secondary floats after ditching.

FIGS. 1, 3, and 4 serve to illustrate the method performed by the invention.

With reference to FIG. 1, the main floats 25 and the secondary floats 30 are folded in flight under normal conditions.

With reference to FIG. 3, when ditching is imminent, all of the main floats 25 are deployed, either on order from a pilot or else on order from calculation means.

With reference to FIG. 4, after ditching, the aircraft is to be found on a liquid surface. All of the secondary floats 30 are deployed, either on order of a pilot, or else on order of calculation means or of a processor unit.

FIG. 4 shows the fact that by arranging a main float 25 between a secondary float 30 and the airframe 2, a large spread 200 may extend transversely between two secondary floats 30. This characteristic can optimize the floating stability of the aircraft.

Figure 5:
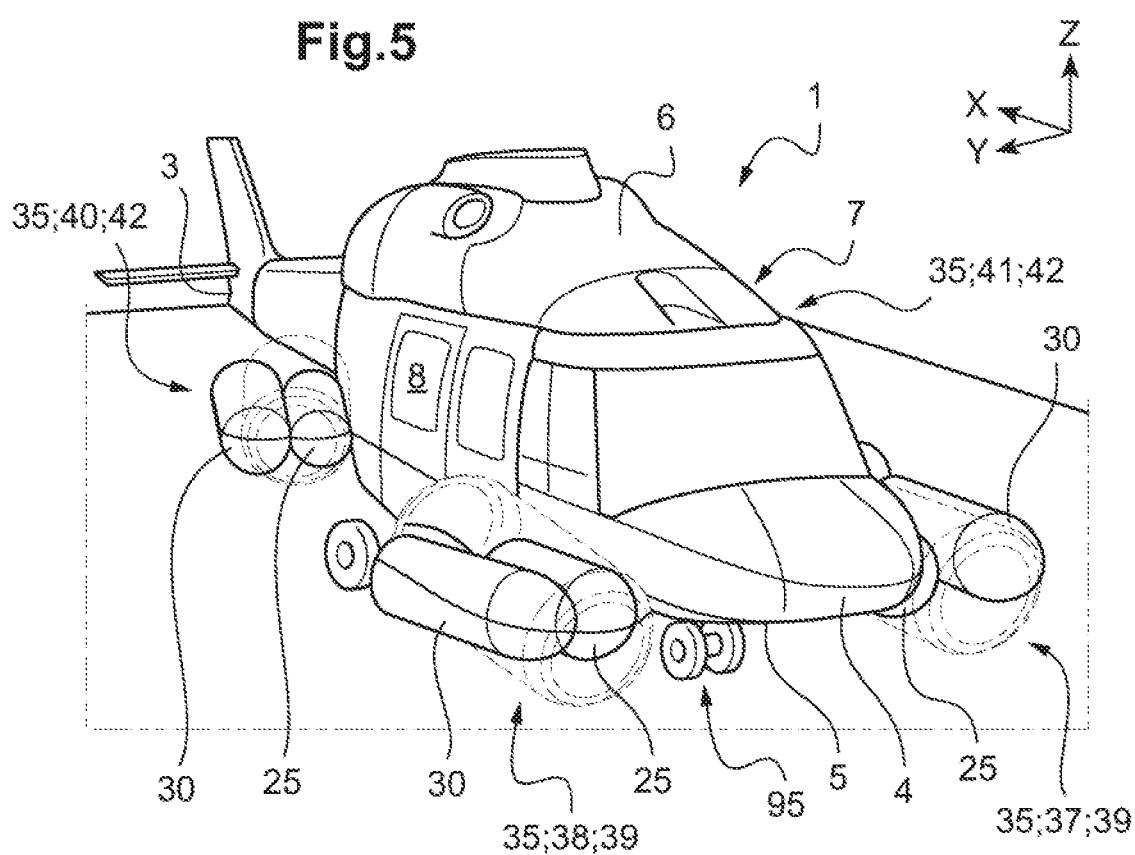
FIG. 5 is a diagram showing an aircraft having a plurality of float units.

FIG. 5 shows an aircraft having main floats 25 and secondary floats 30 that are deployed.

This aircraft presents a pair 39 of front float units comprising a left front float unit 37 and a right front float unit 38.

In addition, the aircraft has a pair 42 of rear float units comprising a left rear float unit 41 and a right rear float unit 40.

Furthermore, FIG. 5 shows in dashed lines the configuration of prior art floats. FIG. 5 thus shows that a float unit can be arranged to take the place of such a prior art float, and can present substantially equivalent overall size.

Naturally, the present invention may be subjected to numerous variations as to its implementation. Although several embodiments are described, it will readily be understood that it is not conceivable to identify exhaustively all possible implementations. It is naturally possible to envisage replacing any of the means described by equivalent means without going beyond the ambit of the present invention.

What is claimed is:

1. An aircraft having a buoyancy system, the buoyancy system comprising:
a plurality of floats, each float of the plurality of floats folded in flight other than during a stage of ditching, the buoyancy system including a deployment system for deploying each float of the plurality of floats outside an airframe of the aircraft, the plurality of floats comprising a plurality of main floats and a plurality of secondary floats, wherein the buoyancy system is configured to deploy the main floats outside the airframe in flight prior to ditching and to deploy the secondary floats outside the airframe after ditching,
wherein the plurality of floats forms a plurality of float units, each float unit having a main float and a secondary float arranged side by side, a main float of a float unit arranged transversely between the secondary float of the float unit and the airframe,
wherein the deployment system comprises at least one main inflator in fluid flow communication with only at least one main float to inflate only the at least one main float, the deployment system including at least one secondary inflator distinct from the at least one main inflator and in fluid flow communication with only at least one secondary float in order to inflate only the at least one secondary float.

2. The aircraft according to claim 1, wherein the plurality of float units comprises at least one pair of float units, the at least one pair of float units comprising two float units arranged transversely on either side of the airframe.

3. The aircraft according to claim 2, wherein the two float units of a pair of float units are arranged symmetrically on either side of the airframe.

4. The aircraft according to claim 1, wherein each main float is connected to the airframe by at least one main cord.

5. The aircraft according to claim 1, wherein each secondary float is connected to the airframe by at least one secondary cord.

6. The aircraft according to claim 1, wherein a secondary float and a main float have a partition in common.

7. The aircraft according to claim 1, wherein a secondary float is stitched and/or adhesively bonded to a main float.

8. The aircraft according to claim 1, wherein each secondary float is in fluid flow communication with at least one main float via a valve, the deployment system comprising at least one main inflator in fluid flow communication with the main floats in order to inject a fluid into the main floats, and the main inflator in fluid communication with the secondary floats via the valve in order to inject the secondary float with fluid.

9. The aircraft according to claim 8, wherein the valve is a passive valve, the passive valve opening when pressure existing in the main float provided with the passive valve exceeds a threshold, the pressure less than the threshold prior to ditching.

10. The aircraft according to claim 8, wherein the aircraft includes a processor unit, the valve is an active valve, the active valve is connected to the processor unit, and the active valve is controlled by the processor unit.

11. A buoyancy system for an aircraft, the buoyancy system comprising:
a plurality of floats comprising at least one pair of main floats and at least one pair of secondary floats, each float of the plurality of floats folded during a stage of flight;
a deployment system for deploying each float of the plurality of floats outside an aircraft during at least one stage of ditching, the deployment system configured to:
inflate the main floats during at least one of the stages of ditching prior to the aircraft reaching the liquid surface; and
subsequent to inflating of the main floats, inflate the secondary floats after the main floats without deflating the main floats.

12. The buoyancy system of claim 11, wherein the plurality of floats forms at least a pair of float units arranged transversely on either side of the aircraft, each float unit having a main float arranged transversely between the secondary float of the float unit and the aircraft.

13. The buoyancy system of 12, wherein the deployment system is further configured to:
inflate the main floats during a first stage of ditching while the aircraft is still in flight; and
subsequently inflate the secondary floats during a second stage of ditching after the first stage of ditching.

14. The buoyancy system of claim 13, wherein the deployment system comprises at least one main inflator in fluid flow communication with only the main floats to inflate only the main floats after the first stage of ditching, and at least one secondary inflator distinct from the at least one main inflator and in fluid flow communication with only at the secondary floats to inflate only the secondary floats after the second stage of ditching.

15. The buoyancy system of claim 13, further comprising a valve disposed between the main floats and the secondary floats, wherein the valve is a passive valve opening when pressure existing in the main float exceeds a threshold, the pressure less than the threshold prior to ditching.

16. The buoyancy system of claim 13, further comprising a valve disposed between the main floats and the secondary floats, wherein the deployment system comprises a processor unit and at least one inflator, the inflator in fluid flow communication with the main floats to inflate only the main floats during the first stage of ditching, and during the second stage of ditching, the processor controls the valve to inflate the secondary floats through the main floats.

* * * * *